(12) United States Patent
Housey et al.

(10) Patent No.: US 6,523,406 B2
(45) Date of Patent: Feb. 25, 2003

(54) GEAR ASSEMBLY WITH ALIGNMENT FEATURE

(75) Inventors: Randal L. Housey, Austin, TX (US); Joseph B. Wieck, Austin, TX (US)

(73) Assignee: Rochester Gauges, Inc., Dallas, TX (US)

( * ) Notice: Subject to any disclaimer, the term of this patent is extended or adjusted under 35 U.S.C. 154(b) by 7 days.

(21) Appl. No.: 09/795,233

(22) Filed: Feb. 26, 2001

(65) Prior Publication Data

US 2002/0117000 A1 Aug. 29, 2002

(51) Int. Cl.⁷ ........................... G01F 28/32; G01F 23/00
(52) U.S. Cl. ........................................ 73/317; 73/290 R
(58) Field of Search ............................. 73/290 R, 305, 73/317

(56) References Cited

U.S. PATENT DOCUMENTS

| | | | |
|---|---|---|---|
| 4,402,209 A | | 9/1983 | Di Domenico ............... 73/1 H |
| 4,688,028 A | * | 8/1987 | Conn ......................... 340/625 |
| 5,305,639 A | * | 4/1994 | Pontefract ..................... 73/317 |
| 6,041,650 A | | 3/2000 | Swindler et al. ............... 73/317 |
| 6,089,086 A | | 7/2000 | Swindler et al. ............... 73/317 |

FOREIGN PATENT DOCUMENTS

GB          1177805          1/1970

* cited by examiner

*Primary Examiner*—Hezron Williams
*Assistant Examiner*—Rodney Frank
(74) *Attorney, Agent, or Firm*—Sidley Austin Brown & Wood LLP

(57) ABSTRACT

A float-type liquid level gauge assembly 20 is provided for measuring the level of a liquid, such as liquefied petroleum gases, in a tank. The liquid level gauge 20 includes a gear housing 50 which provides for an efficient way to couple gears together as well as to accurately assemble and align the components of a liquid level gauge. The liquid level gauge 20 includes a movable pivot arm assembly 70 supporting a float arm assembly 74. A gear on the pivot arm assembly 70 is coupled with a pinion gear 65 located in the gear housing 50. The pinion gear 65 has a shaped passageway 69 which accepts a similarly shaped drive shaft 40 which has a magnet 36 at one end. The magnet 36 extends into a passageway 44 on the lower side 30*b* of a gauge head 30 so as to be magnetically coupled to a level indicating dial assembly 32 provided on the upper side 30*a* of the gauge head 30. The shaped drive shaft 40 only allows for a limited number of ways the drive shaft 40 will fit into the pinion gear passageway 69, thus allowing efficient alignment of the magnet 36 with the level indicating dial 32.

22 Claims, 7 Drawing Sheets

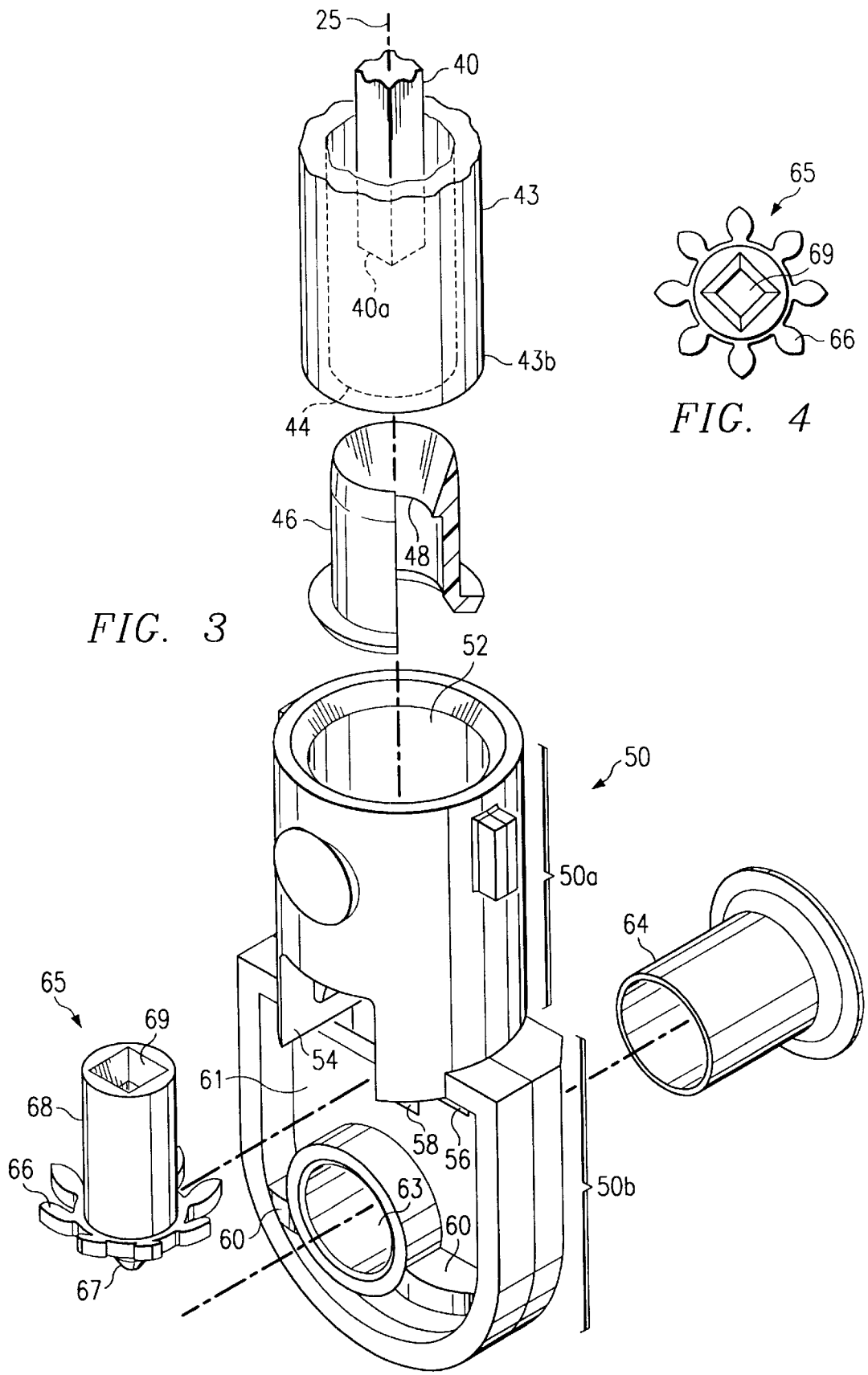

GEAR ASSEMBLY WITH ALIGNMENT FEATURE

TECHNICAL FIELD OF THE INVENTION

This invention relates to gauges for measuring the level of liquid in a tank; in particular, a float-type liquid level gauge for measuring the level of liquid in a tank containing a liquefied gas.

BACKGROUND OF THE INVENTION

This invention relates generally to a liquid level gauge, and more particularly to gauges commonly used for measuring liquefied petroleum gas (LPG) type liquids. The LPG is typically stored as a liquid under pressure in a tank or cylinder. A liquid level gauge may be provided on the tank or cylinder for measuring the level of the liquid.

A typical gauge of this type utilizes a pivoting float arm which moves in response to changes in the liquid level inside the tank. As the float arm pivots, it rotates a gear assembly which turns a drive shaft located in a support arm that is connected to the float arm. The drive shaft is connected to a tank magnet which is magnetically coupled to a receiving magnet, which is in a gauge head. As the drive shaft rotates and rotates the tank magnet, the magnetic flux of the tank magnet rotates the receiving magnet which moves an external liquid level visual indicator, such as a pointer on a dial. Examples of such gauges are disclosed in U.S. Pat. Nos. 6,089,086 and 6,041,650.

In assembling these gauges, it is necessary to align the tank magnet on the end of the drive shaft with a base position of the float arm so that accurate readings will be transferred to the dial assembly. It is important that when the gears connected to the drive shaft in the support arm and the gears connected to the float arm are attached, they are attached at such a position that the tank magnet is aligned to provide an accurate reading of the level of liquid in the tank. Previously, this alignment was done manually by rotating a round drive shaft until the position of the tank magnet on the drive shaft corresponded to the given location of the float arm. At that point, the drive shaft was staked to the gear, permanently attaching the gear to the drive shaft and ensuring that the alignment of the magnet did not change.

Not surprisingly, there are problems with this assembly. It takes time to align the tank magnet to the corresponding position of the float arm. Even then, the accuracy could be compromised if the drive shaft was inadvertently turned before or while the stake is inserted.

There is a continuing need for a gauge that can be assembled more efficiently and with reduced risk of error in the proper alignment of the magnet. In view of this need, this invention provides for a gauge that can be aligned in a trouble free and accurate way, allowing assembly to be more efficient.

SUMMARY OF THE INVENTION

In accordance with one aspect of the current invention, a linkage is provided including a pinion gear, a second gear, and a gear housing. The pinion gear, located in the passageway of the first portion of the gear housing, has a pinion gear neck and an engaging means. The second gear, rotatably attached to the second portion of the gear housing, also has engaging means which mesh with the engaging means of the pinion gear.

In another aspect of the current invention, a linkage is provided comprising a pinion gear, a second gear and a gear housing. In this aspect of the invention, the pinion gear has a pinion gear neck, pinion gear teeth, and a pinion gear nose. The first portion of the gear housing has a passageway for insertion of the pinion gear neck as well as an appendage, such as a support arm. The second portion of the gear housing has a slot to allow the pinion gear teeth unencumbered rotation. The second portion of the gear housing also has a notch for the pinion gear nose to rotate freely. The second gear is rotatably attached to the second portion of the gear housing and the engaging means of the second gear mesh with the teeth of the pinion gear.

In yet another aspect of the current invention, an apparatus for use with a liquid level gauge is provided. The apparatus comprises a pinion gear, a second gear, and a gear housing. The pinion gear neck defines a shaped passageway to accommodate a similarly shaped drive shaft. The pinion gear neck is inserted into a recess in the passageway in the gear housing. As an additional feature, the neck of the pinion gear could be longer than the recess so the pinion gear is more secure in the gear housing. A bushing could also be inserted into the passageway so as to further stabilize the pinion gear. In a further embodiment, the second gear has a nose that is inserted into a receiving passage of the gear housing as a way to rotatably attach the second gear to the gear housing. An alternative could be for the gear housing to have a nose that is inserted into a passage on the second gear. The second gear could also be adapted for use as part of a pivot arm assembly.

In yet another aspect of the current invention, a drive shaft assembly is presented. The drive shaft assembly comprises a drive shaft which has a positioning feature. This positioning feature limits the number of ways the drive shaft can fit into the passageway in the neck of the pinion gear. A magnet holder and a magnet are located on the end of the drive shaft opposite the end that is inserted into the pinion gear neck.

In a still further embodiment, a liquid level gauge is provided including a gauge head, a support arm, a gear housing, a drive shaft assembly, a pivot arm assembly, and a tank magnet. The pivot arm assembly is rotatably connected to the gear housing. The gear housing is attached to the lower end of the support arm and the gauge head is connected to the upper end of the support arm. An internal passageway for insertion of the drive shaft is located in the support arm and continues into the lower portion of the gauge head. In a further embodiment, the drive shaft can be of variable length so different length support arms can be utilized. The tank magnet is attached to the upper end of the drive shaft assembly inside the gauge head. Angular motion of the pivot arm relative to the support arm imparts rotational motion to the drive shaft via the gears, and thus to the tank magnet attached to the drive shaft. In a further embodiment, the pivot arm assembly can also include a counterweight arm and a counterweight.

BRIEF DESCRIPTION OF THE DRAWINGS

A more complete understanding of the invention and its advantages will be apparent from the following detailed description when taken in conjunction with the accompanying drawings in which:

FIG. 3 is a perspective view of a preferred embodiment of the gear housing, pinion gear, bushings, support arm and drive shaft;

FIG. 4 is a top view of a preferred embodiment of the pinion gear;

FIG. 7b is a cross section of a pinion gear designed to be used with the gear housing in FIG. 7a;

DETAILED DESCRIPTION

Figure 1:
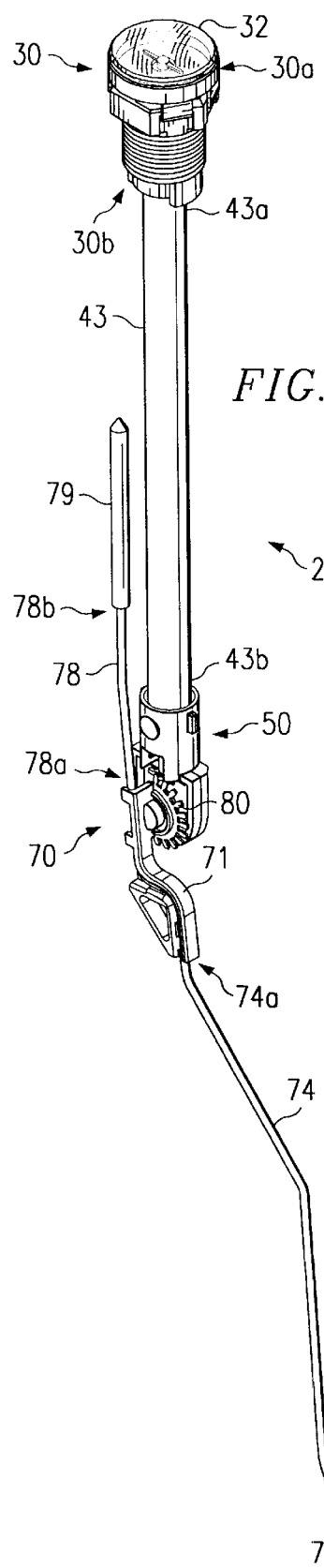
FIG. 1 is a perspective view of a preferred embodiment of the liquid level gauge.

Referring now to the drawings wherein like referenced characters designate like or corresponding parts throughout several views, a preferred embodiment of the liquid level gauge of the present invention is illustrated.

Referring first to FIG. 1, liquid level gauge 20 comprises a gauge head 30, having an upper portion 30a and a lower portion 30b. The upper portion 30a accepts a dial assembly 32 (see FIG. 2a) and the lower portion 30b is connected to a first end 43a of the support arm 43. A second end 43b of the support arm 43 is connected to a gear housing 50. There is a drive shaft passageway 44 that extends from the second end 43b of the support arm 43, through the first end 43a of the support arm 43 and into the lower portion 30b of gauge head 30 (see FIGS. 2b and 3). A pivot arm assembly 70 is rotatably connected to the second portion 50b of gear housing 50. The pivot arm assembly 70 comprises a second gear 80 and an arm attachment portion 71. A first end 74a of a float arm 74 is attached to the arm attachment portion 71. A float 76 is attached to a second end 74b of the float arm 74. In a preferred embodiment, a counterweight 79 is attached to a second end 78b of a counterweight arm 78. The first end 78a of the counterweight arm 78 is attached to the arm attachment portion 71 of the pivot arm assembly 70. It will be appreciated that the float arm 74 can be a single piece, as is known in the art. Also, as is known in the art, counterweights in some designs are not required. Thus, the illustration of a specific design with respect to the float arm is not limiting.

Figure 2A:
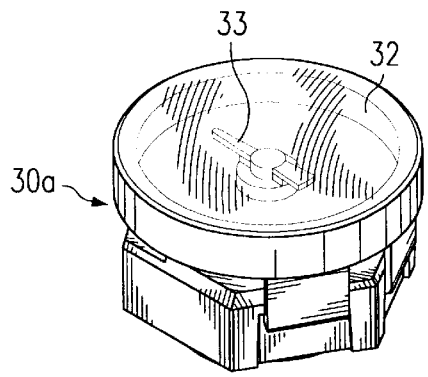
FIG. 2a is a perspective view of the upper portion of the gauge head having a dial assembly.
Figure 2B:
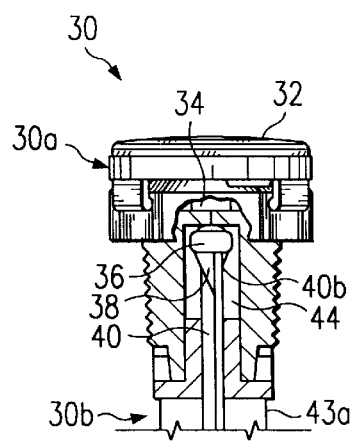
FIG. 2b is a side view of the gauge head. A portion of the gauge head is broken away to show the internal components.

As can be seen in FIG. 2b, there is a drive shaft passageway 44 that extends from the second end 43b of the support arm 43, through the first end 43a of the support arm 43 and into the lower portion 30b of gauge head 30 (see FIGS. 2b and 3). A magnet holder 38 is attached to the second end 40b of the drive shaft 40. In a preferred embodiment, the magnet holder 38 is formed integrally with the drive shaft 40. But, the magnet holder 38 could be attached to the drive shaft 40 by any means known in the art. A tank magnet 36 is placed in the magnet holder 38. In a preferred embodiment, the tank magnet 36 is a cylindrical magnet, but any type of magnet could be used, such as a donut magnet or a bar magnet. A receiving magnet 34 is located in the gauge head 30. As the drive shaft 40 rotates, the tank magnet 36 rotates with the drive shaft 40. The magnetic flux of the tank magnet 36 causes the receiving magnet 34 to rotate, which causes an indicator in the dial assembly 32 to move. In a preferred embodiment, the indicator in the dial assembly 32 is a pointer 33, as seen in FIG. 2a.

Figure 7A:
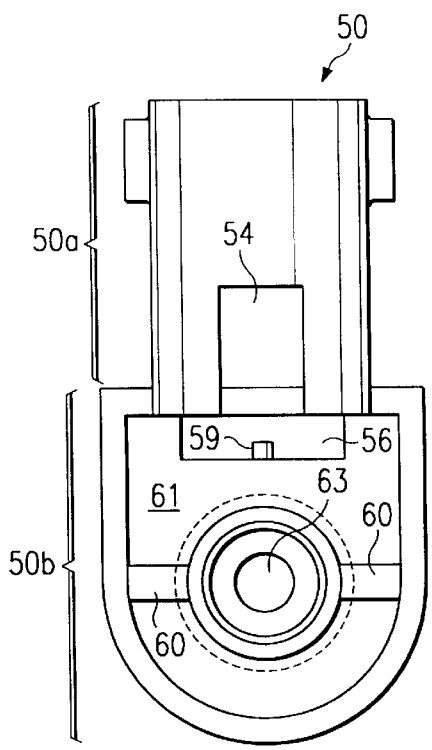
FIG. 7a is a front view of an alternative gear housing containing a pinion pin.
Figure 7B:
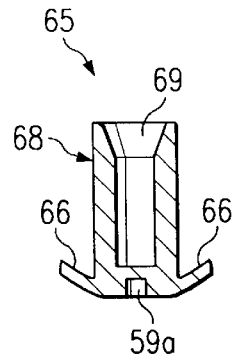

As can be seen in FIG. 3, the gear housing 50 has two portions, the first portion 50a and the second portion 50b. The first portion 50a defines a passageway 52 located along the axis 25 shown in FIG. 3. A recess 54 defined by the first portion 50a and adapted to receive a pinon gear 65, more specifically, a pinion gear neck 68. The pinion gear neck 68 is inserted into the recess 54 of the first portion 50a of the gear housing 50, and the pinion gear teeth 66 fit into a pinion gear tooth slot 56 defined in the second portion 50b operatively adjacent the recess 54. The pinion gear teeth 66 are free to rotate in the pinion gear tooth slot 56. In a preferred embodiment, the pinion gear 65 includes a pinion gear nose 67. The pinion gear nose 67 is free to rotate in the pinion gear nose notch 58 located in the second portion 50b of the gear housing 50 (see FIG. 7d). The pinion gear nose 67 allows for easy assembly and smooth movement of the pinion gear 65. Alternatively, as shown in FIGS. 7a and 7b, the pinion gear tooth slot 56 could contain a pin 59 protruding from the pinion gear tooth slot 56 and the pinion gear 65 could have a receiving portion 59a for this pin. Also, in a preferred embodiment, the pinion gear neck 68 is longer than the recess 54 to further secure the pinion gear 65 in the passageway 52.

In a preferred embodiment, after the pinion gear 65 is inserted into the gear housing 50, a bushing 46 may be inserted into the passageway 52 for further stabilization of the pinion gear 65. This bushing 46 is not required but it helps with ensuring vertical alignment of the pinion gear 65. In a further embodiment of the bushing 46, the bushing 46 could have an internal ledge 48 for the pinion gear neck 68 to rest upon.

The second end 43b of the support arm 43 is inserted into passageway 52 in the first portion 50a of gear housing 50. The pinion gear neck 68 defines a pinion gear neck passageway 69 which is shaped to receive a similarly shaped drive shaft 40. A top view of the pinion gear 65 is shown in FIG. 4. The shape of the drive shaft 40 (which is a positioning feature) limits the number of ways the drive shaft 40 can be inserted into the pinion gear neck passageway 69. In a preferred embodiment, the shape of the drive shaft 40 is square but the drive shaft 40 could be any shape which allows it to be rotated by movement of the pinion gear. Preferably, there are an even number of sides. Limiting the number of ways the drive shaft 40 can be positioned in the pinion gear neck passageway 69 is an important aspect of the invention. For example, when the drive shaft 40 is square and the gears and the magnet holder 38 are both at the correct angular position when the square shaft 40 is inserted into the pinion gear neck passageway 69, the magnet 36 can only be oriented in two positions in the holder 38. The magnet 36 is magnetized along its cylindrical axis with a north and south pole. This allows the assembler to quickly determine the correct orientation of the magnet 36 in the magnet holder 38 by checking the indication of the dial assembly 32 relative to the position of the float arm 74.

Figure 5:
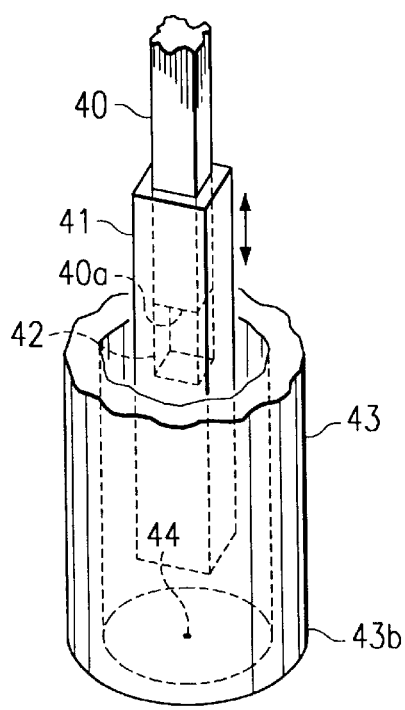
FIG. 5 is a perspective view of an alternative drive shaft, which is an extendable length drive shaft.

FIG. 5 shows a drive shaft 40 which also includes a second drive shaft 41. The second drive shaft 41 defines a passageway 42 in which the first end 40a of drive shaft 40 fits into. This allows for the drive shaft 40 to be extendable, thus allowing the same materials to be used with different length support arms 43.

Figure 6:
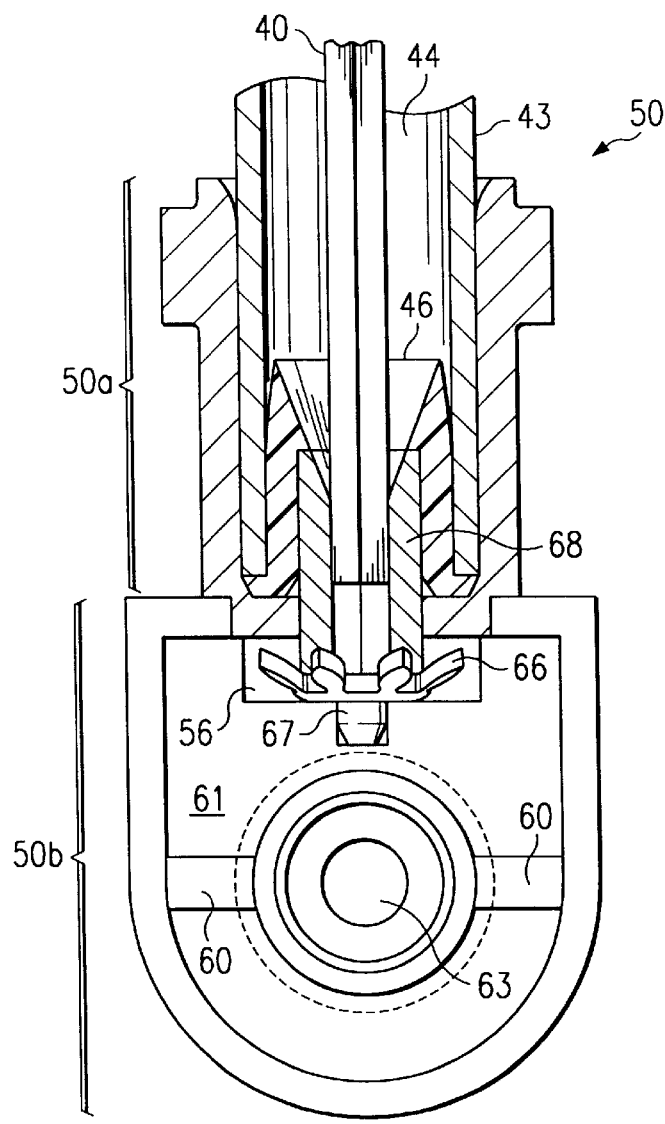
FIG. 6 is a cross-section view of the gear housing with the pinion gear, drive shaft, and alignment bushing in place.
Figure 7C:
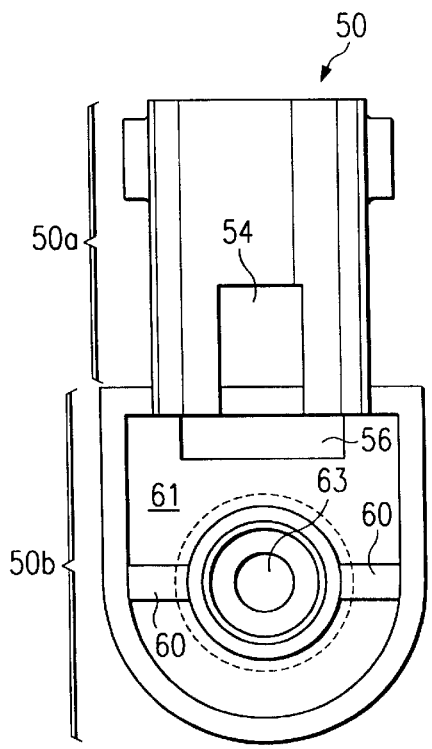
FIG. 7c is a front view of an alternative gear housing to receive a pinion gear with no pinion gear nose.
Figure 7D:
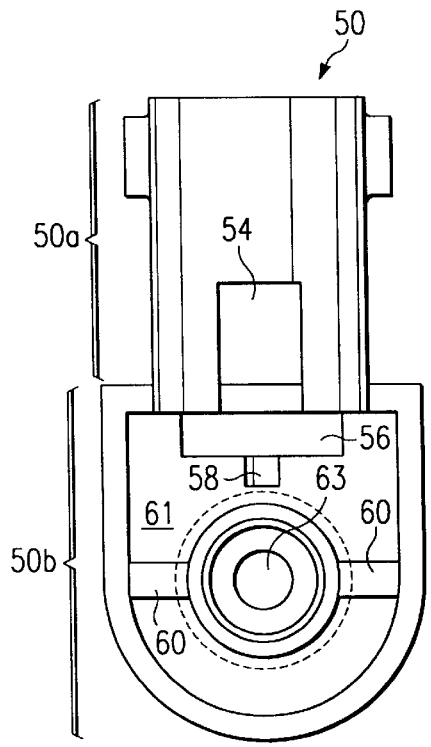
FIG. 7d is a front view of a preferred embodiment of the gear housing, including a pinion gear nose notch.

FIG. 6 shows a cross-sectional view of the pinion gear 65, the bushing 46, the drive shaft 40, and the support arm 43 inserted into the gear housing 50. FIGS. 7a, 7c, and 7d show alternative gear housings 50. FIG. 7a shows a gear housing 50 with a pinion gear pin 59 to hold the pinion gear 65 in place. FIG. 7b shows a cross sectional view of a pinion gear 65 that could be used with the gear housing 50 shown in FIG. 7a. The pinion gear 65 has a receiving passageway 59a to receive the pinion gear pin 59. FIG. 7c shows a gear housing 50 designed for a pinion gear 65 that does not have a pinion gear nose 67. A preferred embodiment is shown in FIG. 7d where the gear housing 50 includes a pinion gear nose notch 58.

Figure 8:
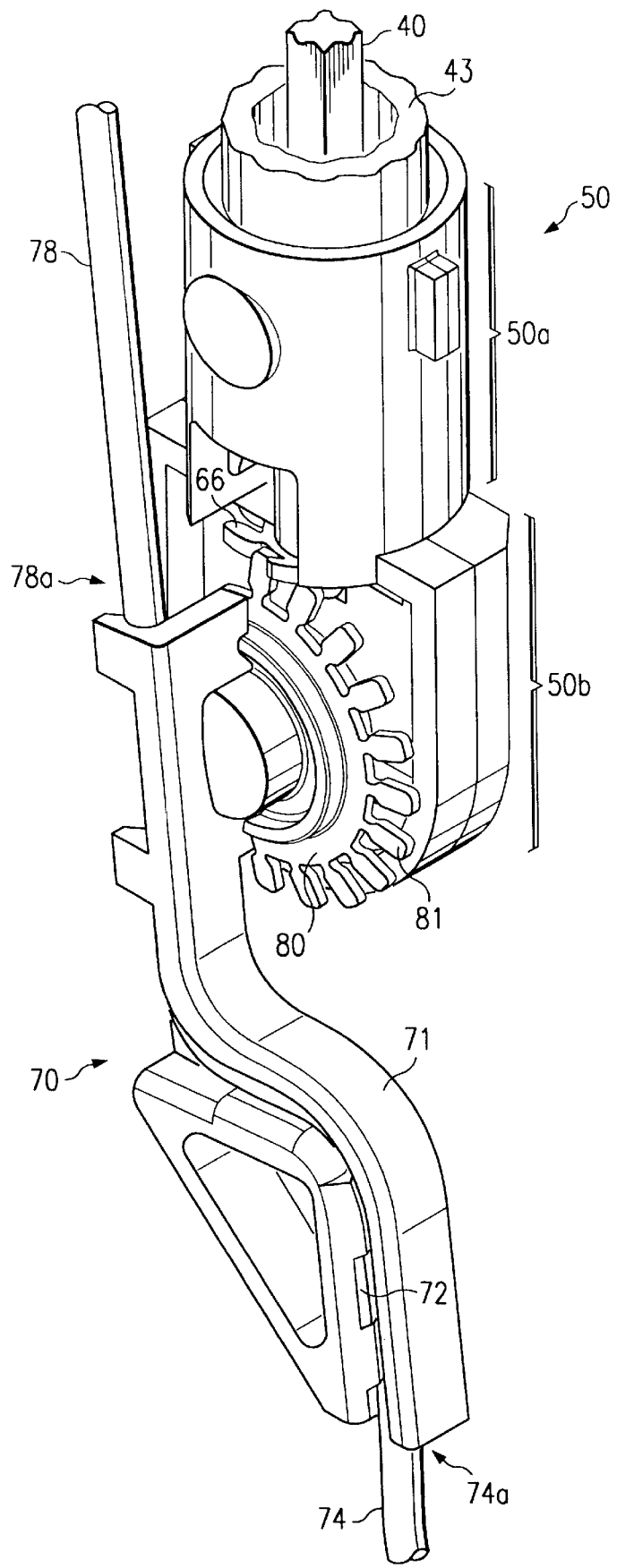
FIG. 8 is a perspective view of the pivot arm assembly inserted in the gear housing.
Figure 9A:
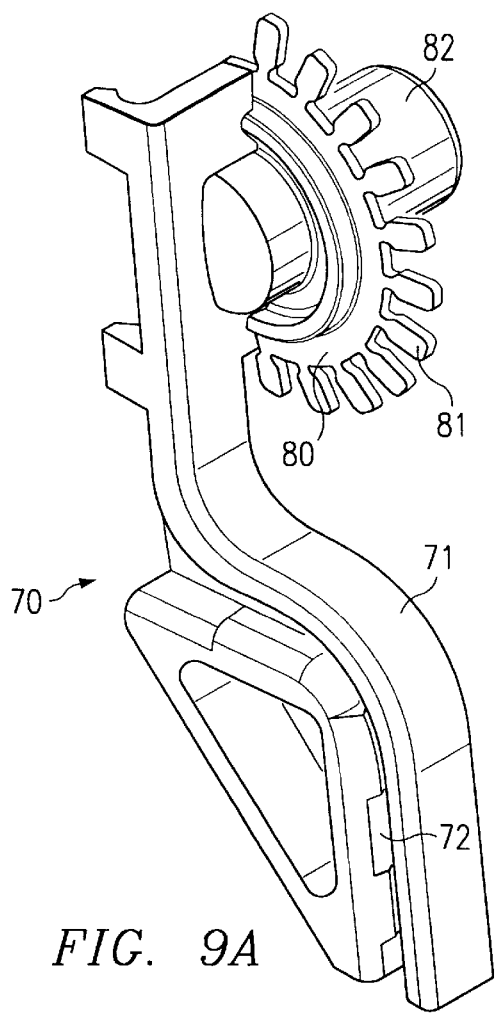
FIG. 9a is a perspective view of the front of the pivot arm assembly.
Figure 9B:
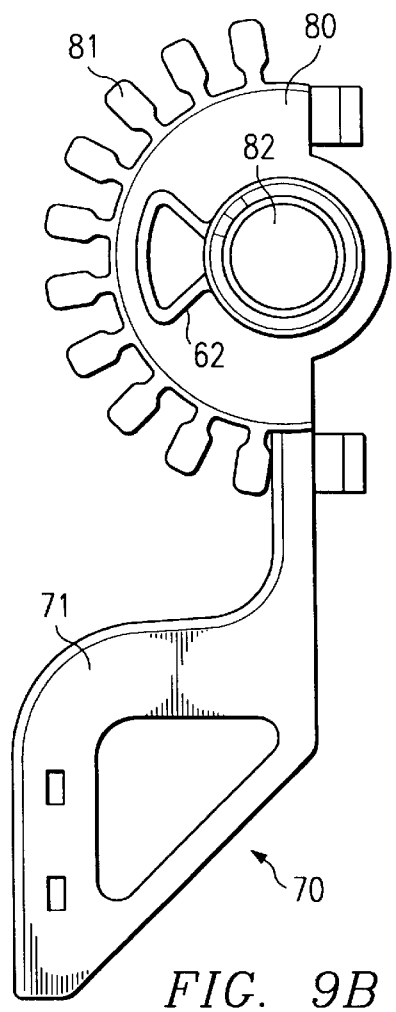
FIG. 9b is a perspective view of the back of the pivot arm assembly.
Figure 10:
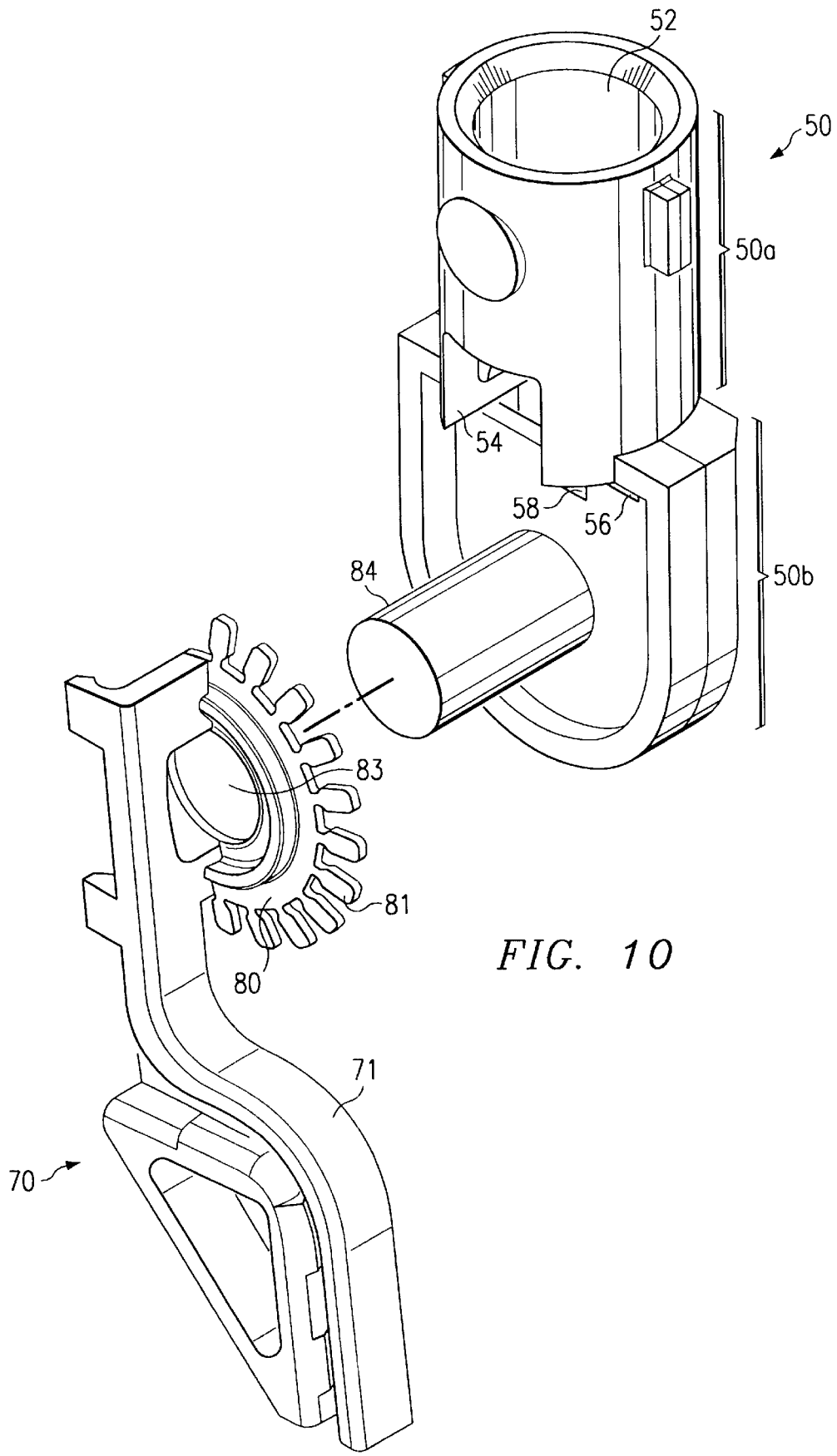
FIG. 10 is a perspective view of an alternate way of attaching the second gear to the gear housing.

As shown in FIG. 8, a pivot arm assembly 70 is rotatably connected to the second portion 50b of the gear housing 50. The pivot arm assembly 70 comprises a second gear 80 and an arm attachment portion 71. The pivot gear assembly 70 can be rotatably attached to the gear housing 50 in many ways. A preferred embodiment is shown in FIGS. 9a and 9b where the second gear 80 has a second gear nose 82 that is inserted into the second portion receiving passage 63 (See FIG. 3). FIG. 10 shows another alternative where the second gear 80 has a second gear receiving passage 83 that receives a second gear pin 84 which is located on the gear housing 50. As shown in FIG. 3, a bushing 64 can be inserted in the second portion receiving passage 63 to further secure the pivot arm assembly 70 to the gear housing 50. Instead of a bushing, a screw or a stake or a pin are just a few examples of alternatives that could be used.

When the pivot arm assembly 70, and hence the second gear 80, are attached to the gear housing 50, the engaging means of the second gear 81 mesh with the engaging means of the pinion gear teeth 66. In a preferred embodiment, the engaging means are gear teeth, but any engaging means known in the art could be used without deviating from the invention.

The arm attachment portion 71 of the pivot arm assembly 70 can be used to attach a float arm 74 and a float 76. The first end 74a of the float arm 74 is attached to the arm attachment portion 71 and held in place by at least one fastening member 72. A few examples of fastening members are stakes, screws, adhesive, as well as any means known in the art. The float 76 is attached to the second end 74b of the float arm 74. A float of any shape can be used without deviating from the present invention. In a preferred embodiment, a counterweight arm 78 is also attached. The first end 78a of the counterweight arm 78 is attached to the arm attachment portion 71. A counterweight 79 is attached to the second end 78b of the counterweight arm 78. The float arm and the counterweight are not essential to the invention.

When the liquid level gauge 20 is inserted in a tank, the float 76 is partially submerged in the liquid. The float 76 is supported by the buoyant force of the liquid. As the level of the liquid within the tank changes, the float 76 and the float arm 74 can move throughout an arc until the stop surfaces 60, located on the gear housing 50, are reached by the stop 62 located on the second gear 80 (see FIGS. 7a, 7c, 7d and 9b). The area between the stop surfaces 60 is a keyway 61, allowing the second gear 80 to move in a predetermined arc, relative to the gear housing 50. The movement of the float arm 74 causes the second gear 80 of the pivot arm assembly 70 to move. This imparts rotary motion onto the pinion gear 65 which moves with the drive shaft 40.

Rotation of the drive shaft 40 causes corresponding motion of the magnet 36 which is fixed to the second end 40b of drive shaft 40 by a magnet holder 38. The rotation of the magnet 36 causes the magnetic field of the magnet 36 to move, causing a corresponding movement of the receiving magnet 34 and a pointer 33 to indicate the level of liquid in the tank. In a preferred embodiment, the dial assembly 32 includes a pointer 33 to indicate the level of the liquid being measured. Any visual indicator could be used without deviating from this invention.

One way to assemble a preferred embodiment of the liquid level gauge 20 is to insert the pinion gear 65 into the pinion recess 54 in the passageway 52 of the upper portion 50a of the gear housing 50. The pinion gear teeth 66 fit into the pinion gear tooth slot 56 and the pinion gear nose 67 rests in the pinion gear nose notch 58, both located in the second portion 50b of the gear housing 50. Insert the first end 40a of the drive shaft 40 into the pinion gear neck passageway 69. The tank magnet 36 is attached to the second end 40b of the drive shaft 40. For further support of the pinion gear 65, insert a bushing 46 into passageway 52. The support arm 43 can be inserted into passageway 52 either before or after the drive shaft 40.

The gauge head 30, including the dial assembly 32 and the receiving magnet 34, can be attached to the first end 43a of support arm 43 either before or after the pivot arm assembly 70, including the second gear 80, is rotatably attached to the second portion 50b of the gear housing 50.

When the pivot arm assembly 70 is rotatably attached to the second portion 50b of the gear housing 50, align the tank magnet 36 to one of two possible positions so the reading of the dial assembly 32 corresponds to the position of the float arm 74. The alignment can be made by rotating the pinion gear 65 which in turn rotates the drive shaft 40. Depending on when the gauge head 30 is attached to the support arm 43, the alignment could be made by turning the drive shaft 40 directly. When the position of the float arm 74 corresponds to the reading on the dial assembly 32, insert a bushing 64 into the back of the second portion 50b of the gear housing 50 to secure the second gear 80, which is on the pivot arm assembly 70.

We claim:

1. A linkage comprising:
   a shaped shaft having a shape and an engaging portion;
   a pinion gear, said pinion gear having an engaging means and a hub, said hub of said pinion gear defining a bore, said bore having a shape corresponding to said shape of said shaped shaft such that said hub is adapted to receive said shaped shaft, said hub defining an engaging area adapted to engage said engaging portion of said shaped shaft when said shaped shaft is inserted into said bore of said pinion gear;
   a second gear, said second gear having an engaging means; and
   a gear housing, said gear housing having a first portion and a second portion,
   said first portion defining a passageway for receiving said shaped shaft and for receiving said hub of said pinion gear, said shaped shaft and said pinion gear being rotatable in said passageway,
   said second portion defining an opening for receiving said second gear, and defining a slot for receiving said engaging means of said pinion gear; and
   said second gear rotatably attached to said second portion of said gear housing so that said engaging means of said pinion gear mesh with said engaging means of said second gear.

2. A linkage adapted to move a shaft having a non-circular cross-section, said linkage comprising:

a pinion gear, said pinion gear having a pinion gear nose, pinion gear teeth and a pinion gear neck;

a second gear, said second gear having an engaging means; and a gear housing, said gear housing having a first portion and a second portion, said first portion defining a passageway having a non-circular shaped cross-section substantially corresponding to the shape of the non-circular cross-section of the shaft, for receiving said pinion gear neck and the shaft, said second portion defining a recess for receiving said second gear;

said second portion defining a slot operatively adjacent said recess for receiving said pinion gear teeth such that said pinion gear teeth rotate freely within said slot, said second portion further defining a notch for receiving said pinion gear nose and adapted to allow said pinion gear nose to rotate freely, and said second gear rotatably attached to said second portion of said gear housing so that said pinion gear teeth mesh with said engaging means of said second gear.

3. An apparatus for use with a liquid level gauge comprising:

a shaped shaft having a positioning feature;

a pinion gear;

said pinion gear having pinion gear teeth and a pinion gear neck;

said pinion gear neck defining a shaped passageway to accommodate said shaped shaft, said shaped shaft having a shape substantially similar to a shape of said shaped passageway defined in said pinion gear neck, said pinion gear further having an engaging feature for engaging said positioning feature of said shaped shaft such that a rotation of said pinion gear would induce a corresponding rotation in said shaped shaft without need for any additional attachment means, and such that there are only a predetermined number of positions said shaped shaft fits into said shaped passageway of said pinion gear neck;

a second gear, said second gear having an engaging means; and a gear housing, said gear housing having a first portion and a second portion, said first portion for receiving said pinion gear and a second portion for receiving said second gear;

said first portion of said gear housing defining a first portion passageway for insertion of said shaped shaft, said first portion further defining a recess adapted to receive said pinion gear neck, such that said pinion gear neck freely rotates within said recess, said second portion of said gear housing defining a slot for free rotation of said pinion gear teeth, said second gear rotatably connected to said second portion of said gear housing so that said second gear engaging means mesh with said pinion gear teeth; and said second gear held into proper rotational alignment by a retention member.

4. An apparatus according to claim 3, wherein said second gear has a face defining a second gear bore, and wherein said second gear further comprises a second gear shaft said second gear shaft having a first end being disposed within said second gear bore and a second end protruding outwardly therefrom.

5. An apparatus according to claim 4, wherein said second portion of said gear housing defines a gear receiving passage to receive said second gear protrusion, and further defines a recess for receiving said second end of said second gear protrusion.

6. An apparatus according to claim 3, wherein said second portion of said gear housing further comprises a second portion protrusion protruding outwardly from said second portion of said gear housing.

7. An apparatus according to claim 6, wherein said second gear further defines an opening to receive said second portion protrusion protruding outwardly from said second portion of said gear housing.

8. An apparatus according to claim 3, wherein said second gear is adapted for use as part of a pivot arm assembly comprising said second gear and an arm attachment portion, said arm attachment portion having at least one fastening element for securely connecting a float arm assembly to said arm attachment portion.

9. An apparatus according to claim 3, wherein said pinion gear neck is longer than said recess in said first portion passageway so as to further secure said pinion gear in said first portion of said gear housing.

10. An apparatus according to claim 3, wherein said apparatus further comprises a bushing for securing vertical alignment of said pinion gear neck in said first portion passageway of said gear housing, wherein said bushing is located in said first portion passageway of said gear housing.

11. An apparatus according to claim 3, wherein said second gear further comprises a protruding stop adapted to interfit within a keyway formed in said second portion of said gear housing such that a range of motion of the second gear relative to the gear housing is restricted to a predetermined arc.

12. An apparatus according to claim 3, wherein said shaped shaft further comprises a second shaped shaft of corresponding shape, said second shaped shaft defining a passageway for insertion of said first shaped shaft, thus allowing for a variable length shaped shaft.

13. A magnet drive shaft assembly comprising:

a drive shaft;

a pinion gear, said drive shaft further comprising a positioning feature for orienting said drive shaft relative to said pinion gear, said pinion gear comprising pinion gear teeth and a pinion gear neck, said pinion gear neck defining a shaped passageway to receive a first end of said drive shaft, said passageway shaped in such a way as to cooperate with said positioning feature of said drive shaft to thereby orient said drive shaft;

a magnet holder attached to a second end of said drive shaft; and a magnet inserted in said magnet holder.

14. A magnet drive shaft assembly according to claim 13, wherein said drive shaft further comprises a second drive shaft of corresponding shape, said second drive shaft defining a passageway for insertion of said first drive shaft, thus creating a drive shaft of varying length.

15. A liquid level gauge comprising:

a gauge head, said gauge head having an upper surface and a lower surface, said upper surface adapted to receive a dial assembly, said gauge head defining a gauge head passageway formed through said lower surface of said gauge head;

a support arm having a first end and a second end and a longitudinal axis, said support arm attached at said first end to said lower portion of said gauge head, said support arm defining a drive shaft passageway therethrough along said longitudinal axis;

a drive shaft assembly comprising a drive shaft having a first end and a second end, said drive shaft including a positioning feature, a magnet holder attached to said first end of said drive shaft, and a magnet inserted in said magnet holder, said drive shaft adapted to be inserted into said drive shaft passageway of said support arm, said magnet and said magnet holder extending into said gauge head passageway;

a gear housing, said gear housing having a first portion for receiving a pinion gear and a second portion for receiving a second gear;

said pinion gear comprising an engaging means and a pinion gear neck, said pinion gear neck defining a shaped passageway for receiving said second end of said drive shaft, said positioning feature of said drive shaft adapted to orient said drive shaft relative to said pinion gear neck, said second gear having an engaging means, said second gear adapted for use as part of a pivot arm assembly comprising said second gear and an arm attachment portion, said arm attachment portion having at least one fastening feature for securely connecting a float arm assembly to said pivot arm;

said first portion of said gear housing having a passageway for insertion of said second end of said support arm, said passageway having a recess to insert said pinion gear into said passageway;

said second portion of said gear housing defining a slot for free rotation of said pinion gear engaging means, said slot operatively adjacent to said recess;

said second gear rotatably attached to said second portion of said gear housing so that said engaging means of said pinion gear mesh with said engaging means of said second gear;

said second gear held into proper rotational alignment by a retention member; and a float arm assembly comprising a float arm and a float;

a first end of said float arm is connected to said arm attachment portion of said pivot arm assembly;

said float is connected to a second end of said float arm.

16. A liquid level gauge according to claim 15, further comprising a counterweight arm and a counterweight, a first end of said counterweight arm attached to said arm attachment portion of said pivot arm;

a second end of said counterweight arm attached to said counterweight.

17. A linkage according to claim 1, wherein said pinion gear engaging means has a face with a protrusion extending outwardly therefrom, and wherein said second portion of said gear housing further defines a notch adapted to receive said protrusion of said pinion gear such that said protrusion is rotatably movable within said notch.

18. A linkage according to claim 1, wherein said shaped shaft has a non-circular cross-section.

19. A linkage according to claim 18, wherein said non-circular cross-section is a square shaped cross-section.

20. A linkage according to claim 2, wherein said non-circular cross-section of said shaped shaft is a square shaped cross-section.

21. An apparatus according to claim 3, wherein said shaped shaft has a non-circular cross-section.

22. An apparatus according to claim 21, wherein said non-circular cross-section of said shaped shaft is a square shaped cross-section.

* * * * *